United States Patent
Brown

(10) Patent No.: US 6,779,616 B1
(45) Date of Patent: Aug. 24, 2004

(54) MOTORIZED DIRECTIONALLY STEERABLE TRAILER TONGUE JACK

(76) Inventor: Clifford Brown, 32 Hartwell Ct., Cincinnati, OH (US) 45216

( * ) Notice: Subject to any disclaimer, the term of this patent is extended or adjusted under 35 U.S.C. 154(b) by 0 days.

(21) Appl. No.: 10/714,764

(22) Filed: Nov. 17, 2003

(51) Int. Cl.[7] ................................................ B62M 7/14
(52) U.S. Cl. ........................................ 180/13; 180/14.2
(58) Field of Search .............................. 180/13, 12, 11, 180/14.2, 15, 16

(56) References Cited

U.S. PATENT DOCUMENTS

| | | | | |
|---|---|---|---|---|
| 3,150,734 A | * | 9/1964 | Duggar, Jr. .................... | 180/11 |
| 3,158,315 A | * | 11/1964 | Hawgood ..................... | 180/13 |
| 3,439,764 A | * | 4/1969 | Kimball ....................... | 180/12 |
| 3,861,482 A | | 1/1975 | Stephens et al. | |
| 3,942,823 A | * | 3/1976 | Shields et al. ............ | 280/423.1 |
| 4,162,711 A | * | 7/1979 | Cornelius .................... | 180/13 |
| 4,511,159 A | | 4/1985 | Younger | |
| 4,537,416 A | | 8/1985 | Linaburg | |
| 4,860,841 A | | 8/1989 | Sacco | |
| 5,016,900 A | | 5/1991 | McCully | |
| 5,529,330 A | | 6/1996 | Roman | |
| 6,170,585 B1 | | 1/2001 | Turner | |
| 6,234,510 B1 | | 5/2001 | Hammons | |
| 6,259,357 B1 | | 7/2001 | Heider | |

* cited by examiner

Primary Examiner—Lesley D. Morris
Assistant Examiner—Tony Winner
(74) Attorney, Agent, or Firm—David J. Dawsey; Michael J. Gallagher; Gallagher and Dawsey Co., L.P.A.

(57) ABSTRACT

A motorized directionally steerable trailer tongue jack having a height adjustment system, a steering system, a drive system, a mounting plate, and a control system. The height adjustment system includes a power transmission screw. The power transmission screw is secured to the drive system at one end and proceeds to pass through the height adjustment system, the mounting plate, and the steering system. The power transmission screw engages the height adjustment system through threaded receipt in a power sleeve nut, and engages the steering system via receipt in a steering sleeve that fixes the relative position of the screw and the sleeve. The power transmission screw and power sleeve nut may be self-locking. The control system may include a wireless user pendent. The control system permits a user to move and steer a trailer while adjusting the tongue height to cooperate with a vehicle hitch.

20 Claims, 7 Drawing Sheets

MOTORIZED DIRECTIONALLY STEERABLE TRAILER TONGUE JACK

TECHNICAL FIELD

The present invention relates to the field of jacks for trailer tongues, in particular, to a motorized and directionally steerable trailer tongue jack that may propel a trailer in a plurality of directions.

BACKGROUND OF THE INVENTION

Vehicle trailers are used in a plethora of applications, ranging from the largest multi-axle commercial trailers weighing many thousands of pounds, to small, single axle trailers weighing only a few hundred pounds that may be towed behind regular passenger cars. These trailers share a common trait. While they may be relatively maneuverable when properly coupled to the towing vehicle, they can be cumbersome to move, even a few feet, when they are not coupled to a towing vehicle, and especially if they are loaded and therefore heavy. Additionally, such trailers frequently need to be coupled and decoupled to a towing vehicle, or perhaps a plurality of different towing vehicles. In order to accomplish this coupling, the tow vehicle, trailer, or both; need to be moved into approximation, and then the tongue of the trailer must be raised over the vehicle hitch, and then lowered and locked into place on the hitch.

This maneuver is both exacting and difficult. Trailers are traditionally equipped with a wheeled tongue jack, such as the jack seen in U.S. Pat. No. 4,511,159 ('159) to Younger, entitled "Trailer Hitch Guide Assembly." The traditional trailer tongue jack, as seen in FIGS. 3 and 4A of the '159 patent, is fixed to the frame of the trailer in the trailer tongue area The jack has a hand crank to raise and lower the trailer tongue off and onto the vehicle trailer hitch, which is generally a ball type device, and the trailer jack rides upon a caster wheel. The trailer is meant to be pushed on its main load bearing wheels and the caster wheel in order to move the trailer.

The process of coupling a trailer to a tow vehicle is exacting. The vehicle and trailer hitches must be approximated no more than about an inch or two of lateral separation. This is difficult to do by backing the tow vehicle, and a heavily laden trailer, even one of modest size, can be extremely difficult to move manually. While decoupling may be somewhat easier, as the trailer needs only to be cranked up off of the trailer vehicle hitch and the vehicle driven away, it is extremely difficult to move a trailer that is decoupled from its tow vehicle. The trailer is heavy, and at least several hundred pounds of "tongue weight" traditionally rests on the trailer jack wheel. Heavy and potentially dangerous physical exertion may be required, and the tow vehicle, trailer, or trailer contents may be damaged by uncontrolled movement.

Various methods have been attempted in simplification of this process. There have been passive guides, such as those seen in U.S. Pat. No. 5,529,330 ('330) to Roman and U.S. Pat. No. 6,234,510 ('510) to Hammons, which are designed to aid in the proper alignment of a backing tow vehicle, so as to guide the approximation of the tow vehicle and trailer. The aforementioned '159 device of Younger acts to pull a trailer tongue laterally after the tow vehicle and trailer are placed in relatively close approximation.

Attempts have been made at improving the approximation process. For example, U.S. Pat. No. 5,016,900 ('900) to McCully provides a plurality of cranks and worm gears to allow vertical and lateral motion of the trailer tongue, and rotational movement of the trailer jack caster wheel. This concept suffers from a number of drawbacks. Firstly, the necessarily small size of the gears makes the mechanical advantage of the device low, and therefore it would be difficult for one of moderate or limited physical ability to use the device with trailers of appreciable weight. In particular, turning of the caster is accomplished with no gear advantage at all, but through a turning bar seen best in FIG. 1 at element 46. Secondly, the cranks each activate movement in only a single plane, therefore, to move the trailer in more than one plane, the operator must first adjust one crank, then another, and then yet another, in order to bring the tow vehicle and the trailer into approximation. Thirdly, the rack and pinion nature of the trailer tongue elevating means, seen best in FIG. 1 at elements 28 and 30, necessitates that the trailer tongue weight is carried on at most one or two teeth of the rack and pinion. Such an arrangement is inherently susceptible to wear or breakage of the teeth, or jamming due to the ingress of foreign objects into the gear mechanism.

U.S. Pat. No. 3,861,482 ('482) to Stephens et al. is similarly configured, with the addition of a coil spring under load from the trailer tongue weight, seen best in FIG. 9 as element 80, and a gasoline engine to power the wheel, seen best in FIG. 9 as element 70. Such a design is even more cumbersome in steering than the '900 device, as the user of the '482 device must hand crank for elevation, hand manipulate a steering bar, and control a gasoline engine attached to the wheel. Additionally, the '482 device employs the structurally suspect rack and pinion method of adjusting height.

Similarly, U.S. Pat. No. 4,860,841 ('841) to Sacco, while using two directional motors, retains the deficient hand cranking height adjustment seen in the other patents cited that results in both difficult cranking for many individuals and a failure to truly be able to mechanically steer the trailer tongue as to both lateral and vertical directions.

Accordingly, the art has needed a means for moving a laden trailer into position behind a tow vehicle, raising the trailer tongue against several hundred pounds of tongue weight, and lowering the trailer tongue hitch onto the corresponding hitch of the tow vehicle. During removal, such means require raising the trailer tongue off of the vehicle hitch, again against several hundred pounds of tongue weight, lowering the trailer tongue into a storage position, and possibly moving the trailer a short distance in any one of several directions for storage. These maneuvers should be accomplished in a smooth and controlled manner with a minimum of physical exertion or danger to the operator. The instant invention accomplishes these, and other, ends.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations.

In one of the numerous configurations, the invention generally comprises a height adjustment system, a steering system, a drive system, a mounting plate, and a control system. The mounting plate releasably joins the present invention to any of the wide variety of trailers commonly pulled by vehicles. The height adjustment system includes a power transmission screw that serves as the backbone of the present invention. The power transmission screw is secured to the drive system at one end and proceeds to pass through the height adjustment system, the mounting plate, and the steering system. The power transmission screw engages the height adjustment system through the threaded receipt in a power sleeve nut, and engages the steering system via receipt in a steering sleeve that fixes the relative position of the screw and the sleeve.

The height adjustment system is joined to the mounting plate by a nut support. The nut support contains a nut support bearing system, the power sleeve nut, and a sleeve nut bearing system. The internal surface of the power sleeve nut has an engagement region that is threaded to cooperate with the thread of the power transmission screw. The power sleeve nut transfers the load from the mounting plate to the power transmission screw. The power sleeve nut is rotated about the power transmission screw by the driving gear powered by an actuator. As the driving gear rotates the power sleeve nut around the power transmission screw, the steering system, the mounting plate, and the height adjustment system, with the exception of the power transmission screw, move vertically up and down the power transmission screw. In a preferred embodiment the power transmission screw and the power sleeve nut cooperate to form a self-locking system that prevents movement in relation to each other while under no influence from the driving gear. In a further variation, the height adjustment system further includes a failsafe follower nut working in conjunction with the power sleeve nut such that upon failure of the power sleeve nut the load is automatically transferred to the failsafe follower nut. The failsafe follower nut and the power sleeve nut rotate together but only the power sleeve nut carries the load during normal operation.

The steering system includes a steering sleeve, having an internal surface and an external surface, a driving gear, an actuator, a steering sleeve bearing system, and a cover. The steering sleeve is adapted to receive the power transmission screw and fix the relative position of the steering sleeve and the power transmission screw, generally through the use of a keyway. The steering sleeve and the power transmission screw are rotated by the driving gear powered by the actuator.

The drive system is adapted to be secured to the power transmission screw and imparts translation motion on the jack and the trailer. The drive system includes a wheel in contact with a rolling surface, generally the ground, whereby the wheel is configured to rotate within a wheel housing, about an axle, and is powered by an actuator that is attached to the wheel housing.

The control system is adapted to control the translation of the trailer, the direction of translation of the trailer, and the tongue height of the trailer. The control system may include a user pendent operatively connected to the jack. The user pendent may be wired, or wireless. In a further embodiment the entire control system may be automated such that when the jack is within a predetermined distance from the desired hitch, the jack guides itself to be in close proximity to the hitch. One such method may include a portable wireless transmitter and a transceiver. The transmitter may be formed to mount on hitch of a tow vehicle and emit a guidance signal and the transceiver receives the guidance signal and automatically controls the translation, direction of translation, and the tongue height.

These variations, modifications, alternatives, and alterations of the various preferred embodiments, arrangements, and configurations may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The motorized directionally steerable trailer tongue jack of the instant invention enables a significant advance in the state of the art. The preferred embodiments of the jack accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
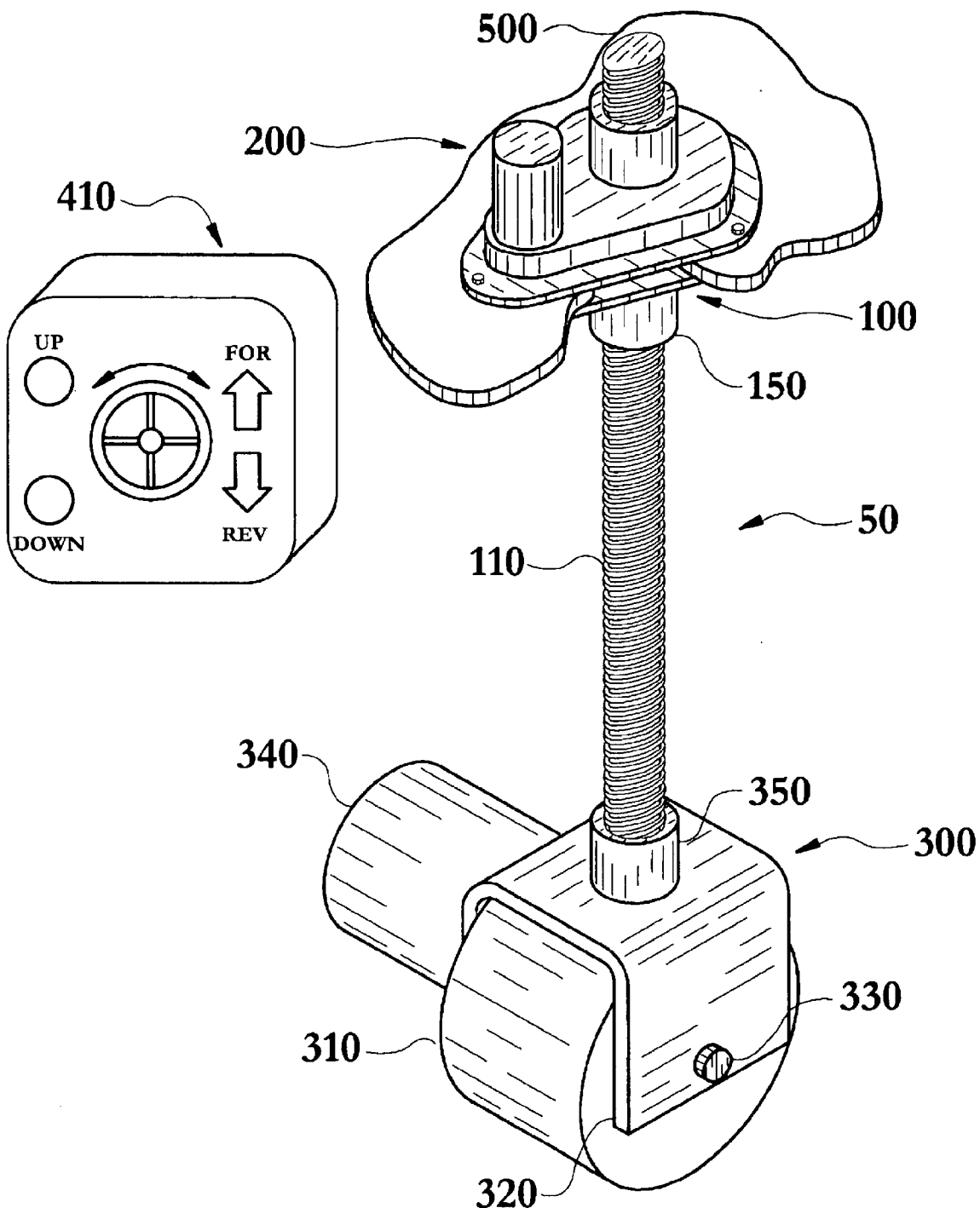
FIG. 1 shows a motorized directionally steerable trailer tongue jack of the present invention in elevated perspective view, not to scale.

In one embodiment, the invention generally comprises a height adjustment system 100, a steering system 200, a drive system 300, a mounting plate 500, and a control system 400, as seen in FIG. 1. The mounting plate 500 is simply an apparatus used in releasably joining the present invention to any of the wide variety of trailers commonly pulled by vehicles. The height adjustment system 100 includes a power transmission screw 110 that serves as the backbone of the present invention. The power transmission screw 110 is secured to the drive system 300 at one end and proceeds to pass through the height adjustment system 100, the mounting plate 500, and the steering system 200, best illustrated in FIG. 2 and FIG. 3 The mounting plate 500 has at least a first surface 510 and a second surface 520, and acts to separate the height adjustment system 100, located nearest the first surface 510, and the steering system 200, located nearest the second surface 520. The power transmission screw 110 engages the height adjustment system 110 through the threaded receipt in a power sleeve nut 120, and engages the steering system 200 via receipt in a steering sleeve 210 that fixes the relative position of the screw 110 and the sleeve 210.

Figure 3:
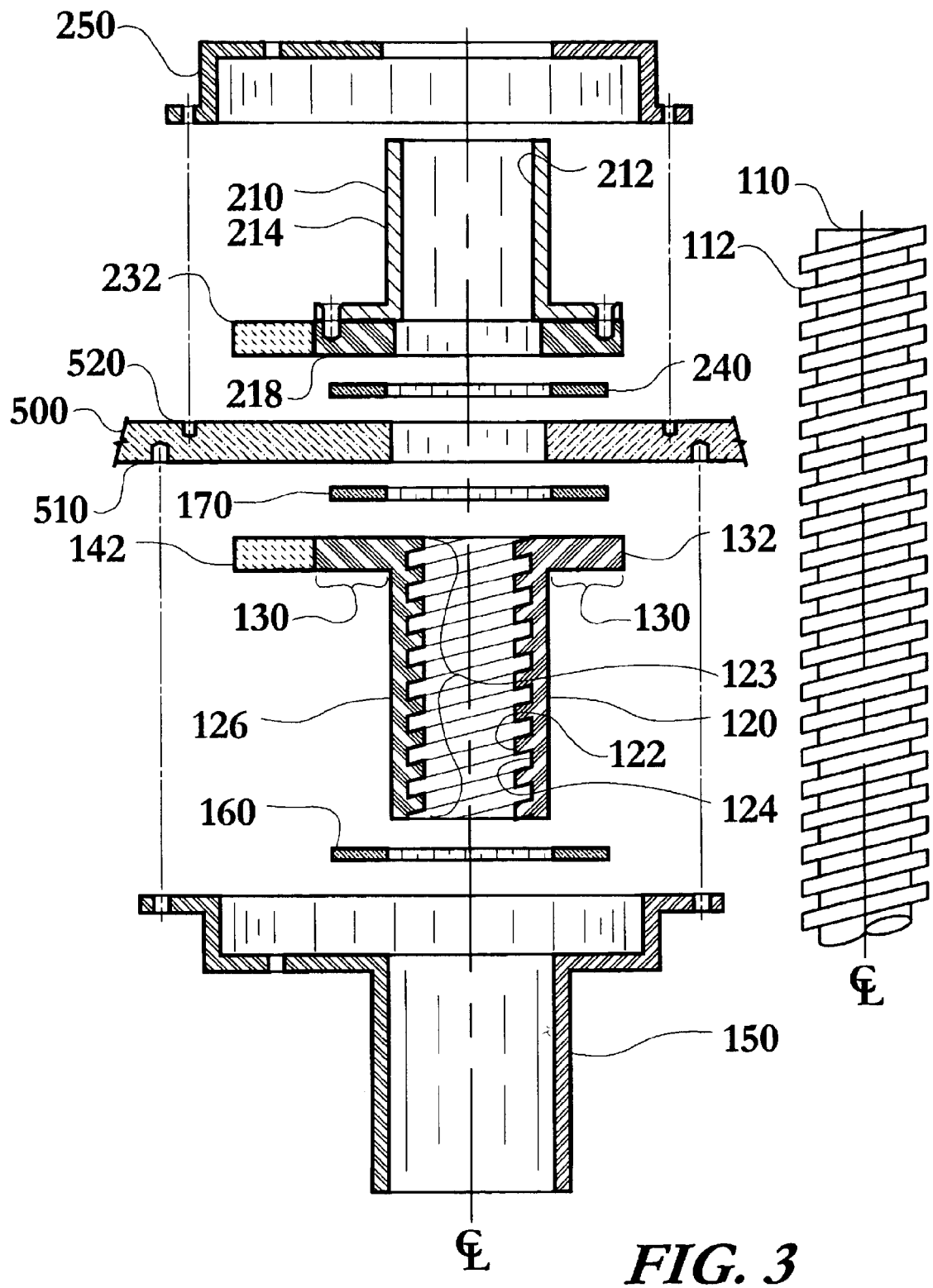
FIG. 3 shows the jack of FIG. 1 in assembly cross-sectional view, not to scale.

Referring still to FIG. 3, the height adjustment system 100 is joined to the mounting plate 500 by a nut support 150. The nut support 150 contains a nut support bearing system 160, the power sleeve nut 120, and a sleeve nut bearing system 170. The power sleeve nut 120 has an internal surface 122 and an external surface 126. The internal surface 122 has an engagement region 123 that is threaded 124 to cooperate with the thread of the power transmission screw 110. The size of the engagement region 123 will vary with the size of the trailer and the load that the jack 50 must support.

Figure 7:
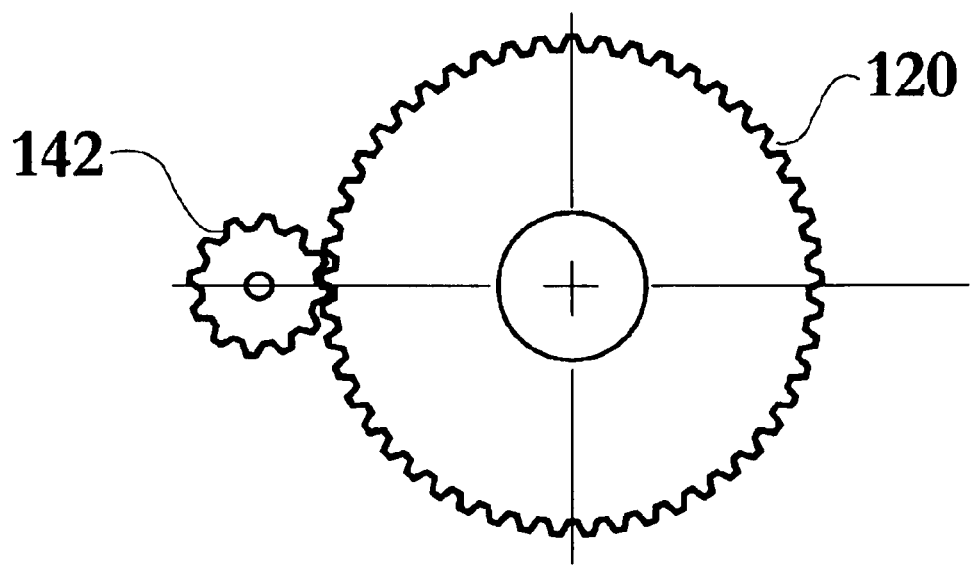
FIG. 7 shows the power sleeve nut and driving gear of FIG. 2 in top plan view, not to scale.

The power sleeve nut 120 is the device that transfers the load from the mounting plate 500 to the power transmission screw 110. The load is transferred to the power sleeve nut 120 from the mounting plate 500 at a load region 130. The load region 130 may be located anywhere on the power sleeve nut 120 and may be configured in any number of ways. In one preferred configuration the load region 130 is formed as a flange at an end of the power sleeve nut 120, commonly referred to as a flange nut. As with the engagement region 123, the size of the load region 130 will vary with the load that must be supported. The power sleeve nut 120 and a driving gear 142 are shown in top plan view in FIG. 7.

The power sleeve nut 120 is rotated about the power transmission screw 110 by the driving gear 142 powered by an actuator 140. The driving gear 142 may cooperate directly with the power sleeve nut 120, as shown in figures, or the power sleeve nut 120 may be attached to a gear that cooperates with the driving gear 142. In one embodiment, illustrated best in FIG. 3, the load region 130 is formed with an integral transmission gear 132. As the driving gear 142 rotates the power sleeve nut 120 around the power transmission screw 110 the steering system 200, the mounting plate 500, and the height adjustment system 100, with the exception of the power transmission screw 110, move vertically up and down the power transmission screw 110.

The power sleeve nut 120 is separated from the mounting plate 500 by a sleeve nut bearing system 170, and is separated from the nut support 150 by a nut support bearing system 160. The bearing systems 160, 170 may incorporate any number of bearing types; however the embodiments illustrated in the figures utilize flat lubricated washer-type bearings. As one with skill in the art will recognize, the type of bearings incorporated into the bearing systems may vary with the size of the trailer intended to be controlled by the jack, and may include sealed bearing assemblies.

Figure 8:
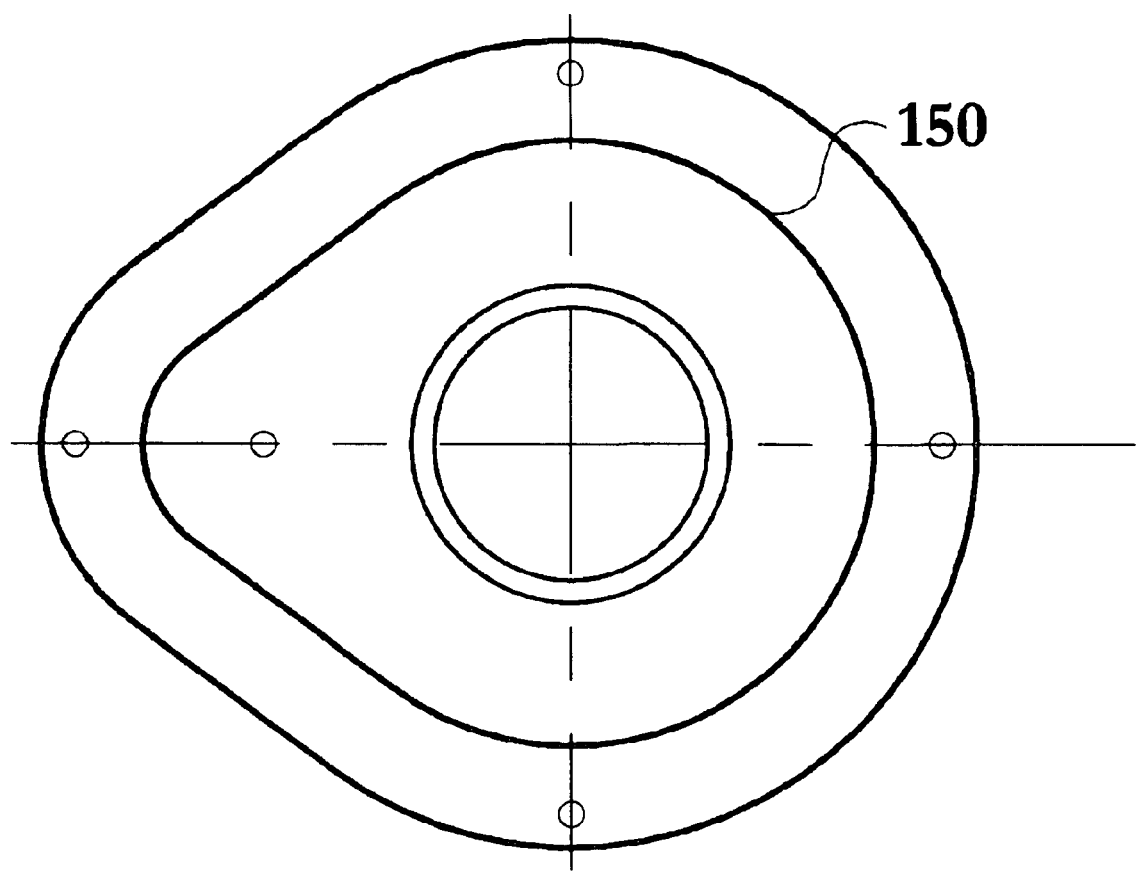
FIG. 8 shows the nut support of FIG. 2 in bottom plan view, not to scale.

The nut support 150 covers the driving gear 142, the nut support bearing system 160, the sleeve nut bearing system 170, and majority of the power sleeve nut 120. The nut support 150 is secured to the mounting plate first surface 510. This releasable interface may simply incorporate traditional bolt fastening means, or may incorporate any number of quick-release type connection devices. Quick-release type connection devices permit the major components of the jack 50 to be easily disassembled for quick and convenient storage. The nut support 150 additionally serves as a safety device to keep the moving gears covered thereby reducing the likelihood of accidental human contact and minimize entry of foreign objects into the moving components. A top plan view of the nut support 150 is illustrated in FIG. 8. The nut support 150 may also serve as a mounting platform for the actuator 140. While the actuator 140 may be virtually any rotary power source, it is preferably a totally-enclosed water-tight direct current electric motor having a shaft that passes through the nut support 150 to the power the driving gear 142. For most non-commercial trailer applications, a motor having a torque rating of 60–120 kg*cm is adequate. The shaft may be provided with access to allow manual operation in the event of failure of the electrical system.

In a preferred embodiment the power transmission screw 110 and the power sleeve nut 120 cooperate to form a self-locking system that prevents movement in relation to each other while under no influence from the driving gear 142. In other words, should the drive gear 142 be completely removed from the system the power sleeve nut 120 and the power transmission screw 110 will remain in their last position and not rotate thereby holding the trailer up, regardless of whether the power transmission screw 10 is wet. As such, an alternative embodiment incorporates a self-locking Acme screw as the power transmission screw 110. Further, the efficiency of the power transmission screw 110 and power sleeve nut 120 is an important aspect to minimizing the required actuator size and maximizing the service life. As such, in one embodiment the power transmission screw 110 and power sleeve nut 120 cooperate to have an efficiency of at least forty-five percent. In yet another embodiment the power sleeve nut 120 is a self-lubricating nut formed substantially of bronze. A preferred power sleeve nut 120 is a 90/10 bronze aluminum nut that is widely commercially available.

Figure 9:
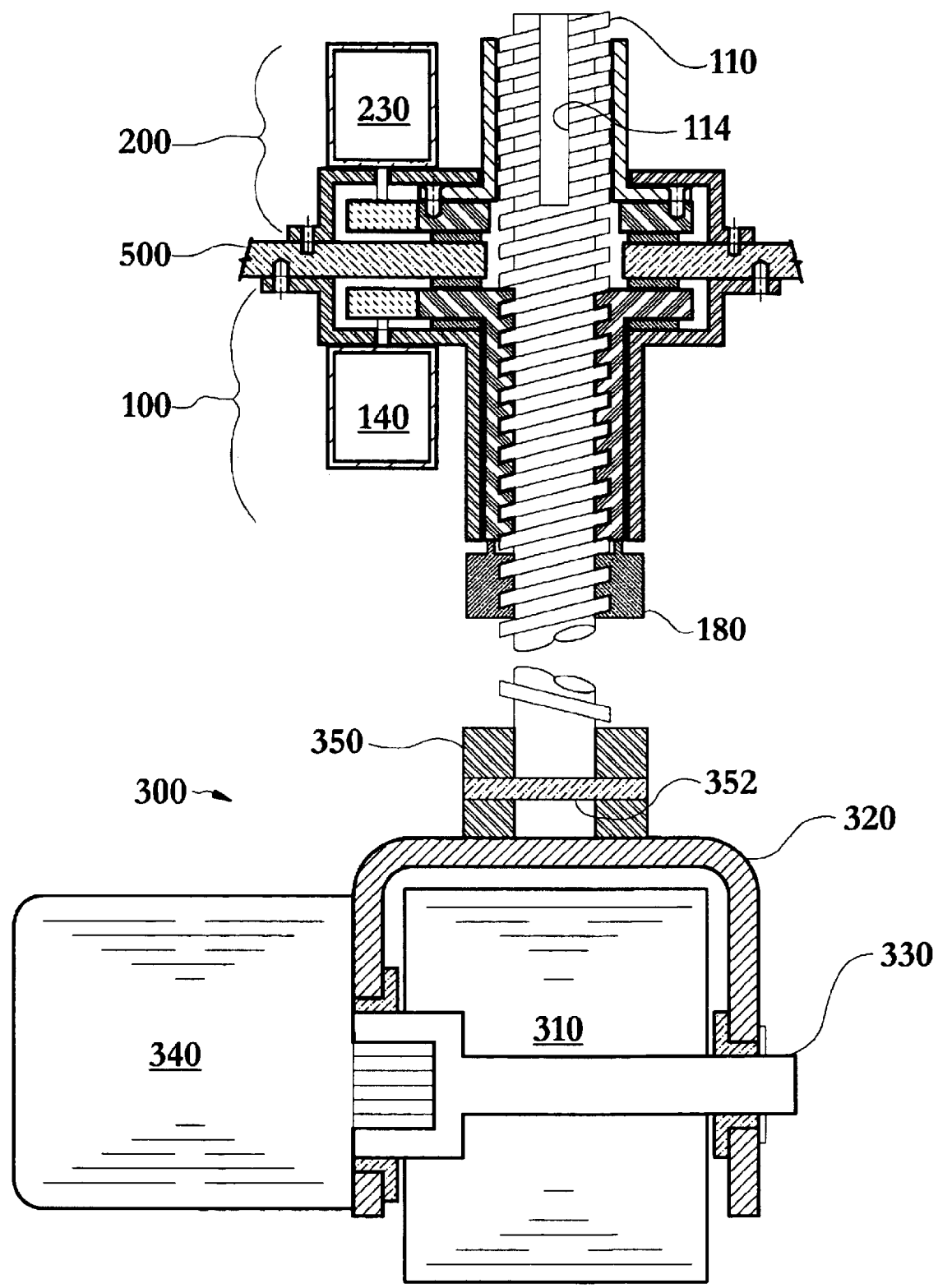
FIG. 9 shows an embodiment of the jack of FIG. 1 in cross-sectional view, not to scale.

In yet a further embodiment, illustrated in FIG. 9, the height adjustment system 100 further includes a failsafe follower nut 180 working in conjunction with the power sleeve nut 120 such that upon failure of the power sleeve nut 120 the load is automatically transferred to the failsafe follower nut 180. The failsafe follower nut 180 and the power sleeve nut 120 rotate together but only the power sleeve nut 120 carries the load during normal operation. For example, the situation may arise that after years of use, and improper maintenance, the power sleeve nut 120 may become gradually more and more stripped, or the thread may become more and more worn. In such a situation, a sudden increased load on the power sleeve nut 120 may strip any remaining threads resulting in the trailer crashing down upon the drive system 300. Such a situation is particularly dangerous given the fact that many trailers are used as standing platforms by their owners, for example boat owners often stand upon the trailer to load equipment into the boat. Therefore, should the extra weight of a person standing on the trailer result in its crashing to the ground, not only may the person be injured but the load may shift causing damage to the load, or further injury to the person.

Now turning to the steering system 200, and again referring to FIG. 3, the steering system 200 is configured to be attached to the mounting plate second surface, opposite the height adjustment system. The steering system 200 includes a steering sleeve 210, having an internal surface 212 and an external surface 214, a driving gear 232, an actuator 230, a steering sleeve bearing system 240, and a cover 250. The steering sleeve 210 is adapted to receive the power transmission screw 110 and fix the relative position of the steering sleeve 210 and the power transmission screw 110. The internal surface 212 of the steering sleeve 210 is substantially smooth and is not intended to threadedly cooperate with the power transmission screw 110. The internal surface 212 may be formed with a keyway 213 sized to cooperate with a keyway 114 in the power transmission screw 110, seen in FIG. 2. A key may then be inserted into the cooperating keyways 114, 213 to fix their relative positions and permit the transfer of rotation from the sleeve 210 to the power transmission screw 110, and thereby to the drive system 300 thus steering the jack 50.

Figure 5:
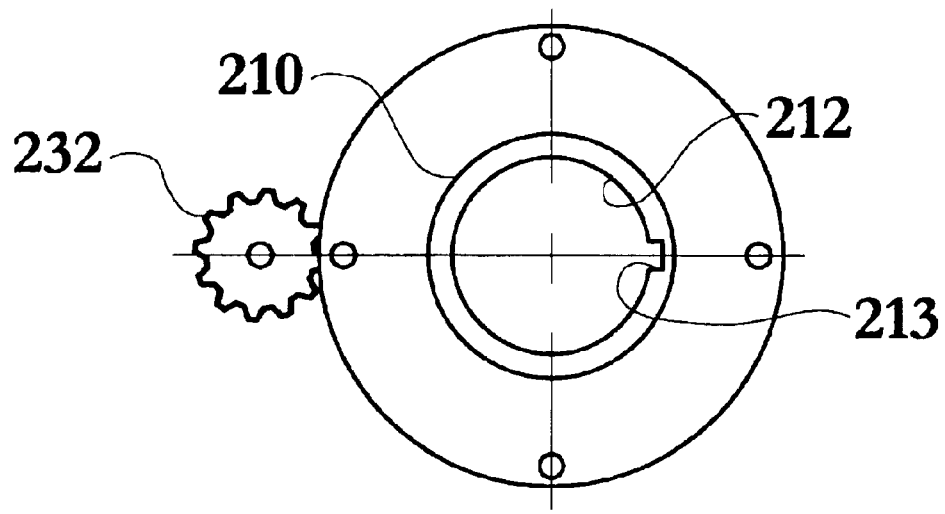
FIG. 5 shows the steering sleeve and driving gear of FIG. 2 in top plan view, not to scale.
Figure 6:
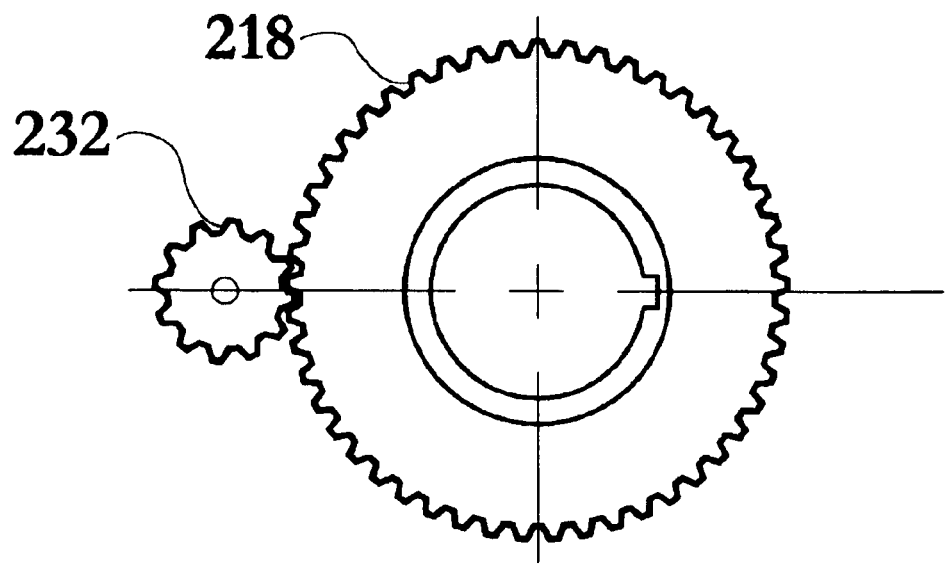
FIG. 6 shows the bottom plan view and driving gear of FIG. 2 in bottom plan view, not to scale.

The steering sleeve 210 and the power transmission screw 110 are rotated by the driving gear 232 powered by the actuator 230. The driving gear 232 may cooperate directly with the steering sleeve 210, not shown, or the steering sleeve 210 may be attached to a steering gear 232 that cooperates with the driving gear 230. A top plan view of the steering sleeve 210 and the driving gear 232 is shown in FIG. 5, with a bottom plan view of the same illustrated in FIG. 6.

Referring again to FIG. 3, the steering sleeve 210 is separated from the mounting plate 500 by the steering sleeve bearing system 240. The steering sleeve bearing system 240 may incorporate any number of bearing types; however the embodiments illustrated in the figures utilize flat lubricated washer-type bearings. As one with skill in the art will recognize, the type of bearings incorporated into the steering sleeve bearing system 240 may vary with the size of the trailer intended to be controlled by the jack 50, and may include sealed bearing assemblies.

The cover 250 encloses the driving gear 232, a portion of the steering sleeve 210, the steering sleeve bearing system 240, and the steering gear 218, when applicable. The cover 250 is secured to the mounting plate second surface 520. This releasable interface may simply incorporate traditional bolt fastening means, or may incorporate any number of quick-release type connection devices. Quick-release type connection devices permit the major components of the jack 50 to be easily disassembled for quick and convenient storage.

Figure 4:
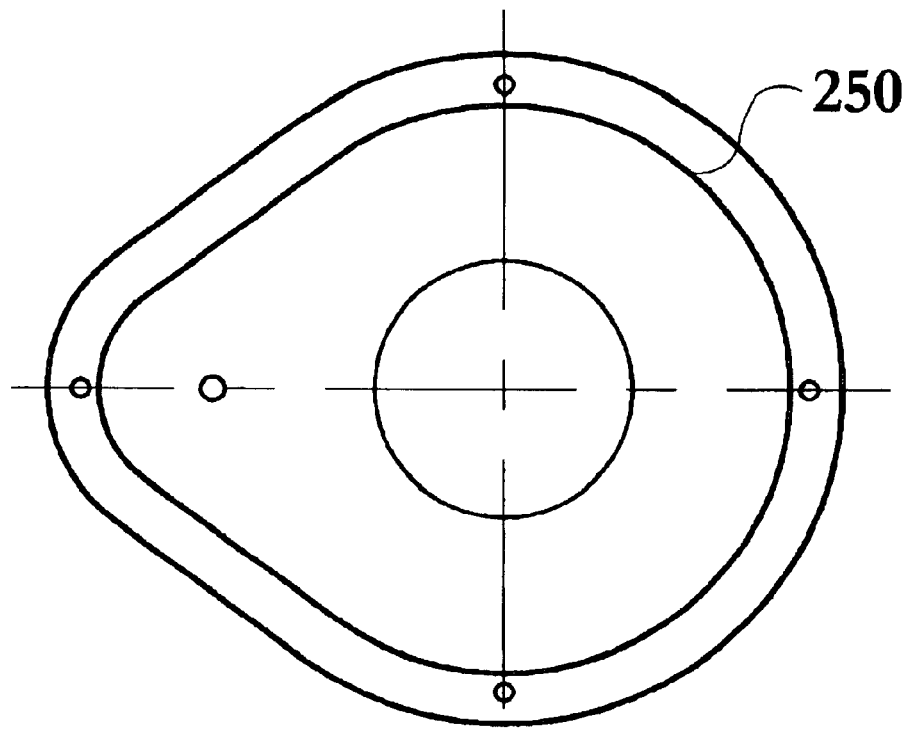
FIG. 4 shows the cover of FIG. 2 in top plan view, not to scale.

The cover 250 additionally serves as a safety device to keep the moving gears covered thereby reducing the likelihood of accidental human contact and minimize entry of foreign objects into the moving components. A top plan view of the cover 250 is illustrated in FIG. 4. The cover 250 may also serve as a mounting platform for the actuator 230. While the actuator 230 may be virtually any rotary power source, it is preferably a totally-enclosed water-tight direct current electric motor having a shaft that passes through the cover 250 to the power the driving gear 232. For most non-commercial trailer applications, a motor having a torque rating of 60–120 kg*cm is adequate. The shaft may be provided with access to allow manual operation in the event of failure of the electrical system.

Figure 2:
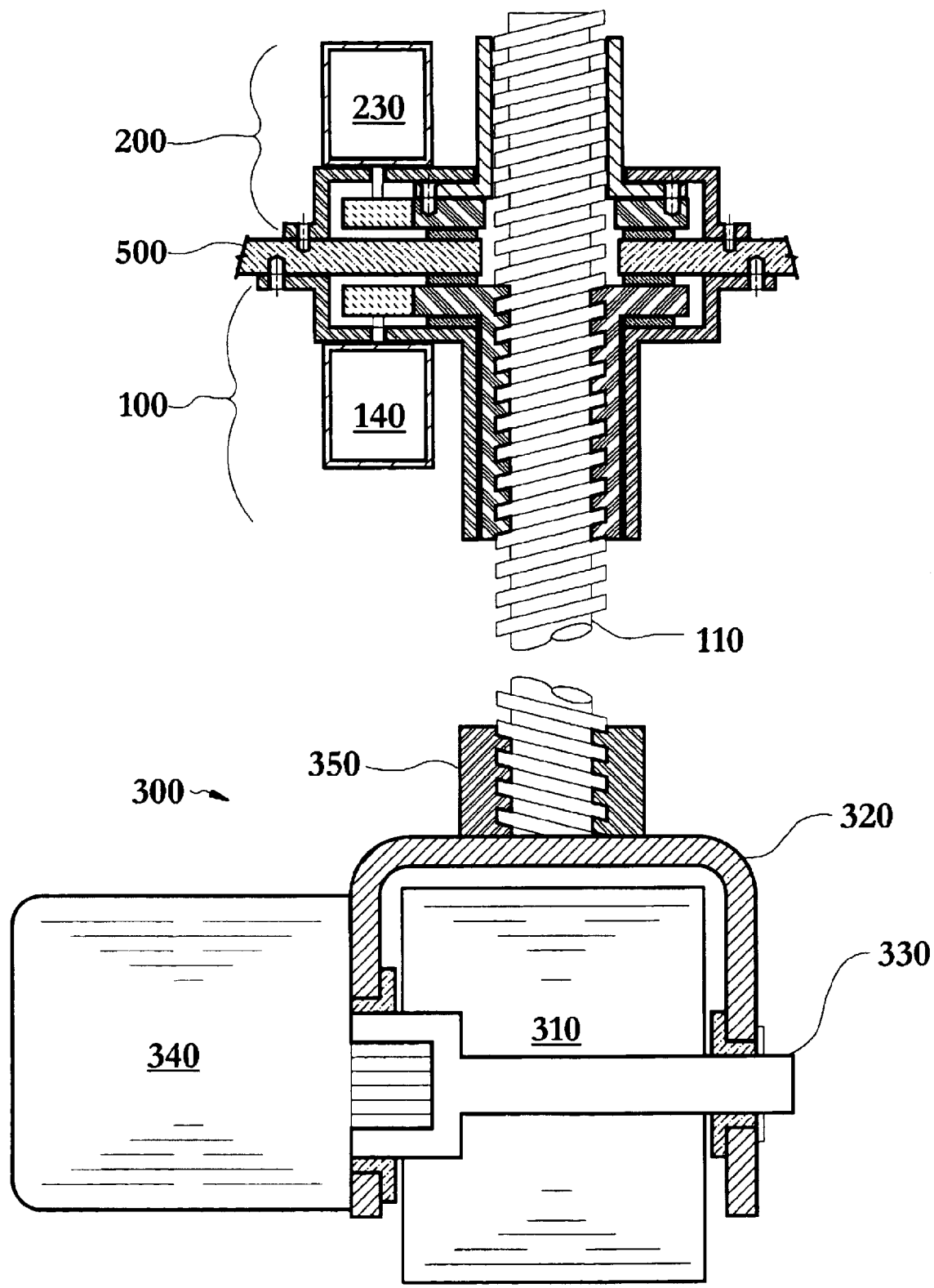
FIG. 2 shows the jack of FIG. 1 in cross-sectional view, not to scale.

Now referring to FIG. 1, the drive system 300 is adapted to be secured to the power transmission screw 110 and imparts translation motion on the jack 50 and the trailer. The drive system 300 includes a wheel 310 in contact with a rolling surface, generally the ground, whereby the wheel 310 is configured to rotate within a wheel housing 320 about an axle 330 and is powered by an actuator 340 that is attached to the wheel housing 320. While the actuator 340 may be virtually any rotary power source, it is preferably a totally-enclosed water-tight direct current electric motor having a shaft that passes through the wheel housing 320 to transmit power to the wheel 310 via the axle 330. In one embodiment a coupling 350 is utilized to attach the power transmission screw 110 to the wheel housing 320, as seen in FIG. 2. The coupling 350 may incorporate a shear pin 352, as seen in FIG. 9, so as to prevent the jack 50 from damaging itself if the wheel 310 should become lodged in a particular location and cannot rotate.

Lastly, the control system 400 is adapted to control the translation of the trailer via the drive system actuator 340, to control the direction of translation of the trailer via the steering system actuator 230, and control the height of the tongue of the trailer via the height adjustment system actuator 140. The control system 400 may include a user pendent 410, as illustrated in FIG. 1, operatively connected to the height adjustment system actuator 140, the steering system actuator 230, and the drive system actuator 340. The user pendent 410 may be wired, or wireless. Additionally, the power to drive the actuators 140, 230, 340 may be obtained from a self-contained battery pack, or may be configured to obtain power from the towing vehicle's power system. The configuration of the user pendent 410 shown in FIG. 1 is merely illustrative of one of many possible configurations of control activation devices.

In a further embodiment the entire control system 400 may be automated such that when the jack 50 is within a predetermined distance from the desired hitch, the jack 50 guides itself to be in close proximity to the hitch. One such method may include a portable wireless transmitter and a transceiver. The transmitter may be formed to mount on hitch of a tow vehicle and emit a guidance signal and the transceiver receives the guidance signal and automatically controls the height adjustment system actuator 140, the steering system actuator 230, and the drive system actuator 340 to position the trailer tongue in close proximity to the hitch.

Various embodiments of the jack 50 may incorporate seals to minimize the entry of foreign objects and water into the working areas of the jack. For example, seals may be incorporated between the nut support 150 and the power sleeve nut 120, between the steering sleeve 210 and the power transmission screw 110, and at each of the bearing systems 160, 170, 240, just to name a few locations. Additionally, various thread sweeping, or cleaning, apparatus may be incorporated into the jack 50 to expel foreign dirt and grit from the power transmission screw threads 112 before it enters, and has a chance to damage, the nut support 150 threads.

Additional service life increasing features may also be incorporated into the present invention. For example, substantially horizontal surfaces of the jack 50 may be sloped or contoured to prevent the accumulation of standing water. Specifically, the horizontal aspect of internal surface of the nut support 150 may be contoured to drain accumulated moisture back toward the power transmission screw 110 where it may exit the nut support 150. Similar drainage enhancing features may be incorporated in the horizontal surfaces of the mounting plate 500 and the cover 250. Further, various airflow improving features such as vents may be incorporated into the jack 50 to aid in the prevention of moisture accumulation.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A motorized directionally steerable trailer tongue jack for precisely positioning a tongue of a trailer, comprising:
   a mounting plate releasably attached to the trailer, wherein the mounting plate has at least a first surface and a second surface;
   a height adjustment system having a power transmission screw threadedly received by a power sleeve nut, a driving gear rotated by an actuator and adapted to rotate the power sleeve nut about the power transmission screw thereby adjusting the height of the mounting plate, and a nut support formed to receive the power transmission screw and a portion of the power sleeve nut and configured to be secured to the mounting plate first surface, wherein the mounting plate first surface and the power sleeve nut are rotably separated by a sleeve nut bearing system, and the power sleeve nut and the nut support are rotably separated by a nut support bearing system;
   a drive system, to effect translation of the trailer, adapted to be secured to the power transmission screw, the drive system having a wheel, in contact with a rolling surface, configured to rotate within a wheel housing about an axle, wherein the wheel is driven by an actuator secured to the wheel housing;
   a steering system, configured to be secured to the mounting plate second surface, having a steering sleeve adapted to receive the power transmission screw and fix the relative position of the steering sleeve and the power transmission screw, a driving gear rotated by an actuator and adapted to rotate the steering sleeve and thereby rotate the power transmission screw and the drive system, and a cover formed to receive a portion of the steering sleeve and configured to be secured to the mounting plate second surface, wherein the mounting plate second surface and the steering sleeve are rotably separated by a steering sleeve bearing system;
   a control system having a user pendent operatively connected to the height adjustment system actuator, the steering system actuator, and the drive system actuator, permitting a user to control the translation of the trailer via the drive system actuator, to control the direction of translation of the trailer via the steering system actuator, and control the height of the tongue of the trailer via the height adjustment system actuator.

2. The motorized directionally steerable tongue jack of claim 1, wherein the power transmission screw and the power sleeve nut cooperate to form a self-locking system that prevents movement in relation to each other while under no influence from the driving gear.

3. The motorized directionally steerable tongue jack of claim 2, wherein the power transmission screw is an Acme screw.

4. The motorized directionally steerable tongue jack of claim 1, wherein the power transmission screw and the power sleeve nut cooperate to have an efficiency of at least forty-five percent.

5. The motorized directionally steerable tongue jack of claim 2, wherein the height adjustment system further includes a failsafe follower nut working in conjunction with the power sleeve nut such that upon failure of the power sleeve nut the load is automatically transferred to the failsafe follower nut.

6. The motorized directionally steerable tongue jack of claim 1, wherein the power sleeve nut is a self-lubricating nut formed substantially of bronze.

7. The motorized directionally steerable tongue jack of claim 1, wherein the steering sleeve is formed with an internal keyway and the power transmission screw is formed with an external keyway, wherein the internal keyway and the external keyway cooperate to fix the relative position of the steering sleeve and the power transmission screw when a key engages each keyway.

8. The motorized directionally steerable tongue jack of claim 1, wherein the user pendent is in wireless communication with the control system.

9. The motorized directionally steerable tongue jack of claim 1, wherein the control system further includes a portable wireless transmitter and a transceiver, wherein the transmitter is formed to mount on a hitch of a tow vehicle and emit a guidance signal and the transceiver receives the guidance signal and automatically controls the height adjustment system actuator, the steering system actuator, and the drive system actuator to position the trailer tongue in close proximity to the hitch.

10. The motorized directionally steerable tongue jack of claim 1, wherein the drive system and power transmission screw interconnection includes a shear pin.

11. A motorized directionally steerable trailer tongue jack for precisely positioning a tongue of a trailer, comprising:
   a mounting plate releasably attached to the trailer, wherein the mounting plate has at least a first surface and a second surface;
   a self-locking height adjustment system having a power transmission screw threadedly received by a power sleeve nut, wherein the power transmission screw and the power sleeve nut cooperate to form a self-locking system that prevents relative movement while under no external influence, a driving gear rotated by an actuator and adapted to rotate the power sleeve nut about the power transmission screw thereby adjusting the height of the mounting plate, and a nut support formed to receive the power transmission screw and a portion of the power sleeve nut and configured to be secured to the mounting plate first surface, wherein the mounting plate first surface and the power sleeve nut are rotably separated by a sleeve nut bearing system, and the power sleeve nut and the nut support are rotably separated by a nut support bearing system;
   a drive system, to effect translation of the trailer, adapted to be secured to the power transmission screw, the drive system having a wheel, in contact with a rolling surface, configured to rotate within a wheel housing about an axle, wherein the wheel is driven by an actuator secured to the wheel housing;
   a steering system, configured to be secured to the mounting plate second surface, having a steering sleeve adapted to receive the power transmission screw, wherein the steering sleeve is formed with an internal keyway and the power transmission screw is formed with an external keyway such that the internal keyway and the external keyway cooperate to fix the relative position of the steering sleeve and the power transmission screw when a key engages each keyway, a driving gear rotated by an actuator and adapted to rotate the steering sleeve and thereby rotate the power transmission screw and the drive system, and a cover formed to receive a portion of the steering sleeve and configured to be secured to the mounting plate second surface, wherein the mounting plate second surface and the steering sleeve are rotably separated by a steering sleeve bearing system;

a control system having a user pendent operatively connected to the height adjustment system actuator, the steering system actuator, and the drive system actuator, permitting a user to control the translation of the trailer via the drive system actuator, to control the direction of translation of the trailer via the steering system actuator, and control the height of the tongue of the trailer via the height adjustment system actuator.

12. The motorized directionally steerable tongue jack of claim 11, wherein the power transmission screw is an Acme screw.

13. The motorized directionally steerable tongue jack of claim 11, wherein the power transmission screw and the power sleeve nut cooperate to have an efficiency of at least forty-five percent.

14. The motorized directionally steerable tongue jack of claim 11, wherein the height adjustment system further includes a failsafe follower nut working in conjunction with the power sleeve nut such that upon failure of the power sleeve nut the load is automatically transferred to the failsafe follower nut.

15. The motorized directionally steerable tongue jack of claim 11, wherein the power sleeve nut is a self-lubricating nut formed substantially of bronze.

16. The motorized directionally steerable tongue jack of claim 11, wherein the user pendent is in wireless communication with the control system.

17. The motorized directionally steerable tongue jack of claim 11, wherein the control system further includes a portable wireless transmitter and a transceiver, wherein the transmitter is formed to mount on hitch of a tow vehicle and emit a guidance signal and the transceiver receives the guidance signal and automatically controls the height adjustment system actuator, the steering system actuator, and the drive system actuator to position the trailer tongue in close proximity to the hitch.

18. The motorized directionally steerable tongue jack of claim 11, wherein the drive system and power transmission screw interconnection includes a shear pin.

19. A motorized directionally steerable trailer tongue jack for precisely positioning a tongue of a trailer, comprising:

a mounting plate releasably attached to the trailer, wherein the mounting plate has at least a first surface and a second surface;

a self-locking height adjustment system having an power transmission screw threadedly received by a self-lubricating power sleeve nut, wherein the power transmission screw and the power sleeve nut cooperate to form a self-locking system that prevents relative movement while under no external influence, a driving gear rotated by an actuator and adapted to rotate the power sleeve nut about the power transmission screw thereby adjusting the height of the mounting plate, a nut support formed to receive the power transmission screw and a portion of the power sleeve nut and configured to be secured to the mounting plate first surface, and a failsafe follower nut formed to work in conjunction with the power sleeve nut such that upon failure of the power sleeve nut the load is automatically transferred to the failsafe follower nut, wherein the mounting plate first surface and the power sleeve nut are rotably separated by a sleeve nut bearing system, and the power sleeve nut and the nut support are rotably separated by a nut support bearing system;

a drive system, to effect translation of the trailer, adapted to be secured to the power transmission screw, the drive system having a wheel, in contact with a rolling surface, configured to rotate within a wheel housing about an axle, wherein the wheel is driven by an actuator secured to the wheel housing and the drive system and power transmission screw interconnection includes a shear pin;

a steering system, configured to be secured to the mounting plate second surface, having a steering sleeve adapted to receive the power transmission screw, wherein the steering sleeve is formed with an internal keyway and the power transmission screw is formed with an external keyway such that the internal keyway and the external keyway cooperate to fix the relative position of the steering sleeve and the power transmission screw when a key engages each keyway, a driving gear rotated by an actuator and adapted to rotate the steering sleeve and thereby rotate the power transmission screw and the drive system, and a cover formed to receive a portion of the steering sleeve and configured to be secured to the mounting plate second surface, wherein the mounting plate second surface and the steering sleeve are rotably separated by a steering sleeve bearing system;

a control system having a wireless user pendent operatively connected to the height adjustment system actuator, the steering system actuator, and the drive system actuator, permitting a user to control the translation of the trailer via the drive system actuator, to control the direction of translation of the trailer via the steering system actuator, and control the height of the tongue of the trailer via the height adjustment system actuator.

20. The motorized directionally steerable tongue jack of claim 19, wherein the control system further includes a portable wireless transmitter and a transceiver, wherein the transmitter is formed to mount on hitch of a tow vehicle and emit a guidance signal and the transceiver receives the guidance signal and automatically controls the height adjustment system actuator, the steering system actuator, and the drive system actuator to position the trailer tongue in close proximity to the hitch.

* * * * *